(12) United States Patent
Wood

(10) Patent No.: US 6,485,152 B2
(45) Date of Patent: Nov. 26, 2002

(54) MATRIX SOLAR DISH

(76) Inventor: Doug Wood, Box 32, Fox Island, WA (US) 98333

(*) Notice: Subject to any disclaimer, the term of this patent is extended or adjusted under 35 U.S.C. 154(b) by 0 days.

(21) Appl. No.: 09/834,266

(22) Filed: Apr. 12, 2001

(65) Prior Publication Data

US 2001/0036024 A1 Nov. 1, 2001

Related U.S. Application Data

(60) Provisional application No. 60/202,042, filed on May 5, 2000.

(51) Int. Cl.$^7$ ................................................. G02B 5/10
(52) U.S. Cl. ...................... 359/853; 359/846; 126/696
(58) Field of Search ........................... 359/846, 847, 359/850, 851, 852, 853; 126/684, 690, 696

(56) References Cited

U.S. PATENT DOCUMENTS

| | | | |
|---|---|---|---|
| 4,119,428 A | 10/1978 | De Angelis | 65/287 |
| 4,145,021 A | 3/1979 | Gaechter | 248/371 |
| 4,372,772 A | 2/1983 | Wood | 65/106 |
| 4,398,802 A | 8/1983 | Auger | 350/292 |
| 4,435,043 A | 3/1984 | Mertens | 350/288 |
| 4,468,848 A | 9/1984 | Anderson | 29/526 |
| 4,583,520 A | 4/1986 | Dietrich | 126/424 |
| 4,613,870 A * | 9/1986 | Stonier | 343/915 |
| 4,678,292 A | 7/1987 | Miyatani | 350/609 |
| 4,682,865 A | 7/1987 | Rogers | 350/607 |
| 4,784,700 A | 11/1988 | Stern | 136/248 |
| 5,104,211 A * | 4/1992 | Schumacher et al. | 343/912 |
| 5,956,191 A | 9/1999 | Blackmon | 359/846 |
| 6,219,009 B1 * | 4/2001 | Shipley et al. | 343/912 |

OTHER PUBLICATIONS

Http://www.harbornet.com/sunflower/pvdish.html Solar Dish 1999 Wood Concentrator Materials.

* cited by examiner

Primary Examiner—Mark A. Robinson

(57) ABSTRACT

A matrix solar dish concentrator with flexed glass mirrors is patterned from orthogonal planes parallel to the axis of symmetry of a paraboloid and intersecting the paraboloid, this pattern making all parabolic trusses uniform. Parabolic trusses are made by flexing linear truss members with lateral forces creating accurate parabolic member curves, restraining the flexed members with rigid webbing to form an orthogonal paraboloid frame. Parabolic glass mirrors are made by flexing slender flat glass mirrors with lateral forces creating accurate parabolic mirror curves, restraining the flexed mirrors with tension buttons connected to the orthogonal paraboloid frame to form a solar dish. Glass mirror structural substrates are not used. The solar dish tracks the solar azimuth with a bicycle wheel and tracks the solar zenith with a television satellite dish actuator. A solar receiver is supported with a low shade structure outside a cone of concentrated sunlight. Uniform flux is greater than 1000 suns and suitable for high-intensity photovoltaic cells and district heating systems.

6 Claims, 5 Drawing Sheets

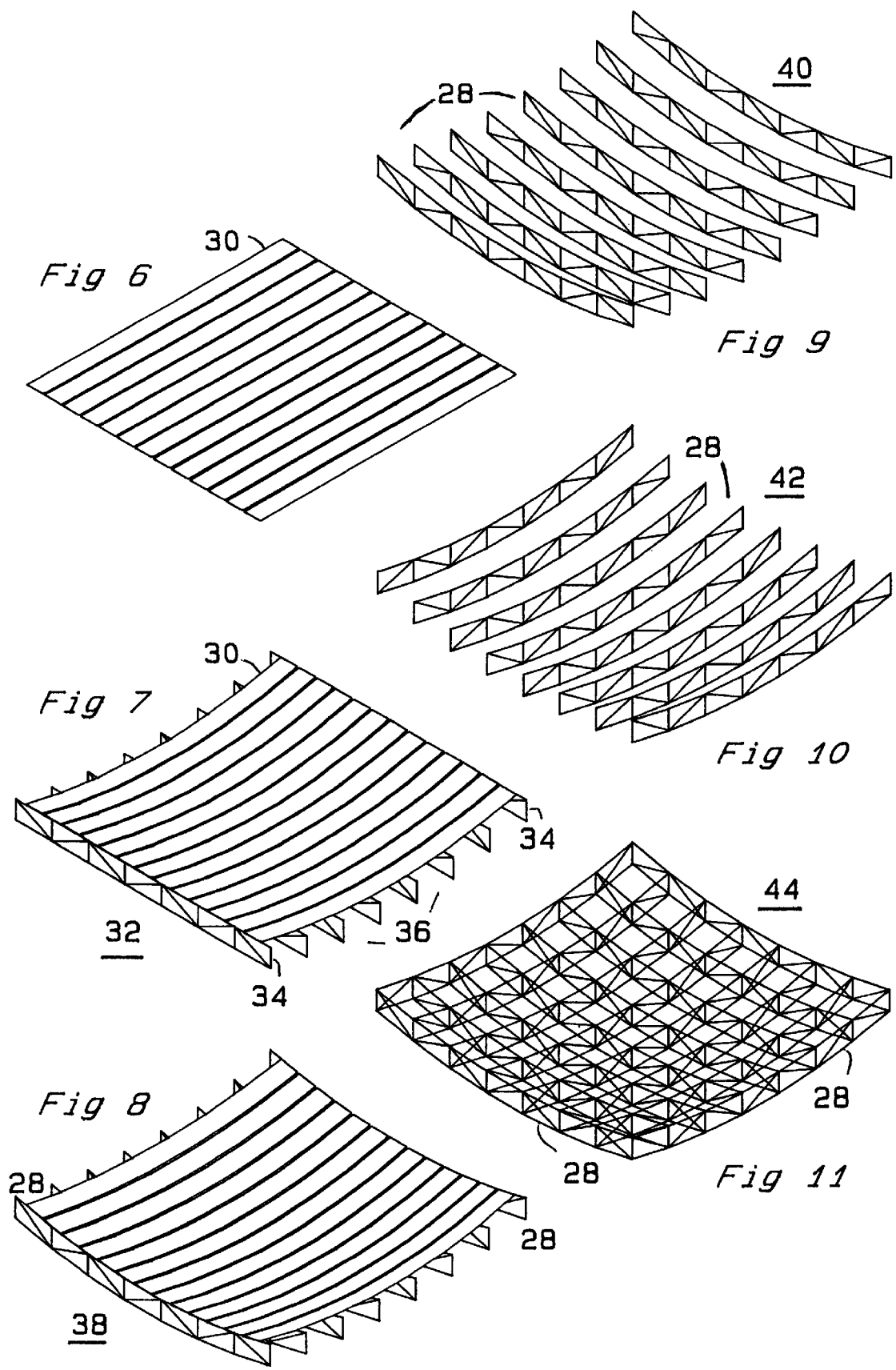

MATRIX SOLAR DISH

CROSS REFERENCE

This application is entitled to the benefit of Provisional Patent Application Ser. No. 60/202,042 filed May 5, 2000.

FIELD OF INVENTION

This invention relates to solar concentrators, specifically paraboloid dish reflectors used for concentrating solar energy onto nearby receivers.

BACKGROUND OF THE INVENTION

The Greenhouse Effect is a problem that can only be solved with cost effective solar energy systems. Solar collectors in remote areas in the countryside can collect summer solar energy and supply city winter base and peak heat and hot water demands by utilizing district heat distribution with seasonal heat storage. Communities in Northern Europe are 100% solar heated with hot water in the winter using district heating systems powered by solar collectors that operate only in the summer.

Reflecting solar concentrators are the most efficient solar heat collectors. The cost of materials compared with the energy delivered indicates that solar concentrator technology should be exceedingly cost effective. There are thousands of solar concentrator designs and scores of prototypes. However, the manufacture of solar concentrators does not exist. Complexity of implementation is a prior-art problem. Lack of information, materials, and manufacturing skills create impediments for market introduction and rapid expansion of cost effective solar concentrators.

Prior-art mirrors used in solar concentrators are commonly made from flat glass coated with silver, followed by moisture protection layers made from copper films, paint, sheet metal, or a second layer of flat glass or glass like substance. Silvered low-iron glass mirrors are 96% efficient. Painted glass mirrors have long-term outdoor lifetimes. The prior art also demonstrates soft mirror materials such as flexible reflecting polymer films, polished metals, and acrylic refractors. These soft materials were used for making curved solar reflectors because glass was considered hard, rigid, and brittle, and therefore would not bend sufficiently for nearby dish receivers. However, the soft materials failed in the field due to low efficiency, short-term lifetimes, poor specular reflection, ultraviolet degradation, and excessive dirt buildup. U.S. Pat. No. 4,372,772 describes a system bending flat glass mirrors in a solar dish concentrator which results in glass being bent to an extent previously thought not possible. However, this glass is only bent and does not form parabolic curves, therefore does not form the high-intensity uniform flux required by high-intensity photovoltaic cells.

There are three generic types of solar mirror concentrators; heliostats or central receiver type, parabola troughs or line focus type, and paraboloid dishes or point focus type. Heliostats are substantially flat reflectors concentrating sunlight onto distant towers. The disadvantages of heliostats include critical mirror contour requirements and the expense of tall towers supporting remote receivers. Troughs are simple-curve parabolic reflectors concentrating sunlight onto long receiver pipes spanning the full length of the reflectors. The disadvantages of troughs include low maximum solar concentration, high receiver heat loss, and high receiver cost. Both heliostats and troughs do not face directly at the sun therefore both have reduced performances known as cosine losses. Solar dishes are compound-curve paraboloidal reflectors concentrating sunlight onto small receivers supported near the centers of dish apertures. Dishes achieve the highest solar concentrations, the best efficiencies, and face directly at the sun. The disadvantages of dishes includes the cost of compound and complex reflector curves and expensive mirror substrates. Both heliostats and dishes require accurate optical mirror contours and accurate optical dual axis tracking. These optical accuracy requirements have been significant cost barriers in the prior art.

Prior-art solar dish concentrator methods and designs also have disadvantages from unnecessary construction complexity. These include forming compound and complex structural curves, molding substrates for controlling mirror curve contours, deflecting reflective membranes with air pressure, heat sagging glass for making fixed curved mirrors, structures with contiguous mirror support for mirror curve shaping, systems for avoiding mirror thermal stress from dissimilar structural materials, curving mandrels, reflected laser light for mirror adjustments during construction, expensive motorized solar tracking drives, tracking rails, and pivot bearings. Performance disadvantages of the prior art include shade from receiver supports and non-uniform flux on high-intensity photovoltaic cells at the focus.

The advantages of the present invention resolves one or more prior-art solar dish disadvantages with the simple use of readily available materials manufactured in high volume from existing large industries. These materials are flexed into accurate parabolic curves with existing skills and without special tools nor measurements. Curved parts and curved templates are not used for construction. Substrates are not used. Rather, spans of straight struts are parabolically curved and spans of flat glass mirrors are parabolically curved during construction from deflection of rigid materials stressed with lateral forces. The lateral forces are applied by a method of assembling the rigid materials into flexed solar dish concentrators. The stressed parabolic materials do not form permanent curves and would spring flat again if disassembled, thereby maintaining force reactions. This parabolic deflection from force reactions demonstrates a natural phenomenon that shows parabolic curves are formed from opposing forces, such as the curves of wires between poles, the trajectory of canon balls, and the deflection of horizontal structural beams from gravity. The disclosed invention uses this phenomenon to make accurate parabolic curves from flat raw materials flexed during assembly of solar dish concentrators in the field.

All of the parts are the same size and are identical for easy assembly. This unity occurs when the mirror supporting framework is assembled perpendicular or normal to the dish aperture rather than, as the prior art shows, assembled perpendicular or normal to the reflecting surfaces. Trusses supporting paraboloid glass mirrors at specific angles less than normal permit accurate parabolic trusses with equal focal lengths to accurately support paraboloid glass with varying focal lengths required by paraboloidal shapes and solar dish optics. The dish has a rectangular aperture to support uniform rectangular glass for easy assembly and low waste manufacturing.

The flexed glass mirror solar dish concentrator is optically accurate and delivers uniform high-intensity solar flux greater than 1000 suns. Mirror shaping substrates are not necessary. Post construction adjustments are not necessary. The solar dish concentrators can be constructed worldwide with indigenous skills and with off-the-shelf materials at costs well below the current costs for fossil fuels. High volume solar dish manufacturing firms are not required for low cost implementation. Special manufacturing tools are not required.

Thus, it is a general object of the present invention to provide a paraboloidal glass mirror and a altazimuth solar tracking mirror support framework which overcomes one or more of the disadvantages of the prior art noted above. Other objects and advantages will become apparent from the specifications and drawings.

It is a further object of the present invention to supply vast amounts of solar energy at costs substantially less than the costs of fossil fuels, solar energy supplied from millions of light-weight durable solar dishes assembled indigenously with heavy application of available raw materials from large existing industries.

It is a further object of the present invention to provide a paraboloidal dish reflector apparatus which has a geometry particularly suitable for quick assembly from identical parts without special tools or skills.

It is a further object of the present invention to provide a method for making accurate smooth paraboloidal space frames from flexed linear members without curve measurements and adjustments.

It is a further object of the present invention to provide a system and a method for flexing flat glass mirrors to form accurate parabolic curves without curve measurements and mirror alignments.

It is a further object of the present invention to provide accurate glass mirror solar dishes made without mirror support substrates.

It is a further object of the present invention to provide parabolic dishes suitable for reflecting uniform high-intensity solar flux onto concentrator photovoltaic cells.

It is a further object of the present invention to provide a system for supporting dish receivers configured for minimum receiver shading.

It is a further object of the present invention to provide a system for accurately tracking solar concentrators towards the sun with off-the-shelf weather resistant components mass produced for other products.

SUMMARY OF THE INVENTION

Accordingly, the present invention is a parabolic solar dish which includes a rigid support matrix of substantially paraboloid configuration, which comprises a plurality of strut-like members which are in turn joined together forming trusses substantially within planes parallel to the axis of symmetry of a paraboloid, planes that do not intersect the axis of symmetry of the paraboloid. The concave parabolic edges of the trusses are produced by patterns of intersections of the paraboloid and the aforementioned planes. This method of pattern definition is used to create uniform trusses and uniform strut-like members throughout a paraboloid space frame. The method of connecting the strut-like members flexes rigid linear truss rails into identical smooth parabolic curves.

The present invention also includes a system for flexing otherwise rigid flat glass mirrors which have a rectangular and slender shape. The system includes a space frame for supporting the slender flat glass mirrors near each mirror corner and button tension elements positioned at predetermined points along the long edges of the slender flat glass mirrors for applying forces normal to the reflecting surfaces. The force flexes spans of the rigid slender flat glass mirrors into substantially accurate parabolic curves suitable for high-intensity uniform flux solar applications, such as illuminating high-intensity photovoltaic cells. The mirror curve becomes hyperbolic near the mirror corners and sunlight reflected from these regions will not be intercepted by high-intensity photovoltaic cells.

The present invention also includes a system for altazimuth tracking the angle of the sun. The system includes an azimuth drive support apparatus that adapts to not level ground for rotating the solar dish concentrator utilizing a drive wheel, such as a bicycle wheel, in contact with the ground and a second wheel driving the rim of the drive wheel for speed reduction. A small gear motor drives the rim of the second wheel. A zenith tracking drive is made with a television satellite dish actuator or screw-jack drive. Solar tracking becomes accurate with small low-cost drive motors and solid state microprocessors. Reliability is enhanced with weather resistant components such as bicycle wheels and dish actuators.

The present invention also includes a system for supporting a solar dish receiver at the apex of a cone of reflected sunlight. The system includes two energy transport support tubes outside the cone of reflected sunlight and two guy wires outside the cone of reflected sunlight for supporting the receiver with minimum loss from direct shade and reflected shade.

DESCRIPTION OF THE DRAWINGS

FIG. 6 shows a row of identical rectangular slender flat glass mirrors.

FIG. 7 shows a method for making a parabolic glass mirror reflector.

FIG. 8 shows a method for making a paraboloidal glass mirror reflector.

FIG. 9 shows a row of parallel identical flexed parabolic trusses for mirror support.

FIG. 10 shows a row of parallel identical flexed parabolic trusses for frame support.

FIG. 11 shows a paraboloid matrix space frame.

DESCRIPTION OF PREFERRED EMBODIMENTS

Figure 1:
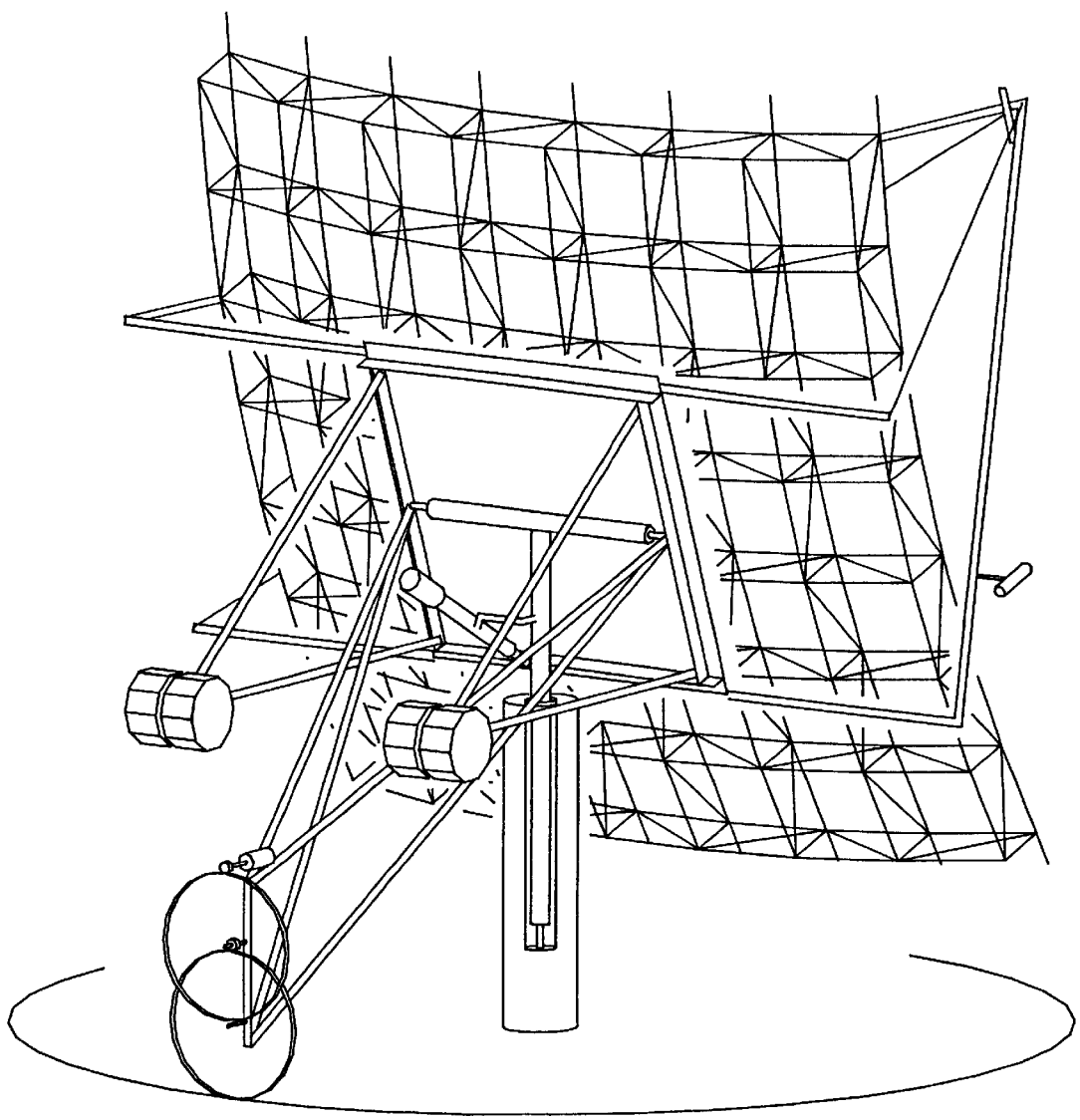
FIG. 1 shows an establishing view of a matrix solar dish.

A preferred embodiment of the structure of the present invention is illustrated in FIG. 1 (matrix solar dish) and FIG. 8 (stressed glass). These figures show parabolic flexing of long narrow strips of glass mirror on a matrix of uniform flexed parabolic trusses. The trusses can be made identical if and only if they are defined by the intersection of a paraboloid and any plane parallel to the axis of symmetry of the paraboloid and not intersecting the axis of symmetry of the paraboloid. Trusses defined by such planes that contain the axis of symmetry are a special case forming the prior-art gore section dishes that have a spider web appearance. This method of forming compound curves with identical off-axis trusses is exclusive and unique to paraboloidal compound curves.

FIG. 1 shows an altazimuth solar tracking system and a uniform flux high-intensity photovoltaic receiver located at a focal length of a paraboloid reflector. The focal length is defined as the distance from the center of a paraboloid reflector to the focus. Parabolic curves contain focal lengths defined by the Cartesian coordinate formula $P=(X*X)/(4*Z)$ where P is the focal length of a simple curve. This formula creates the shape of solar trough or line focus reflectors. Paraboloidal curves are parabolic curves rotated around an axis of symmetry and the focal lengths are defined by the formula $P=(X*X+Y*Y)/(4*Z)$ where P is the focal length along the axis of symmetry of a compound curve. This formula creates the complex shape of a solar dish or a paraboloid point focus reflector. The parabolic focal lengths of mirrors near the rim of a paraboloid dish are longer than the parabolic focal lengths of mirrors near the center of of the dish.

Figure 2:
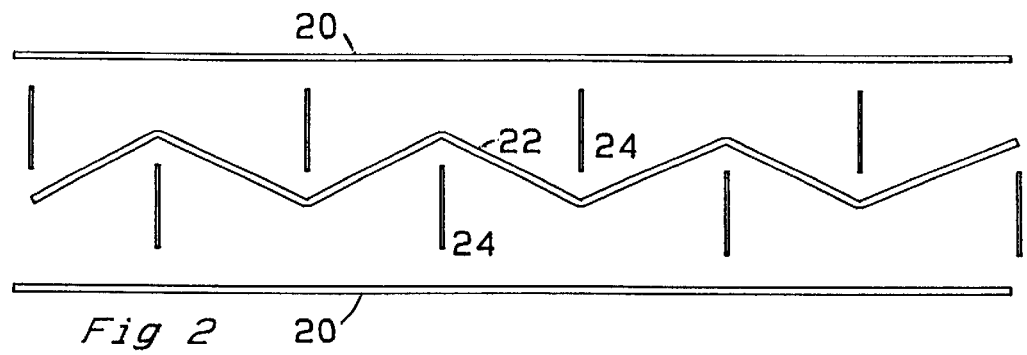
FIG. 2 shows three parts used to make a paraboloidal space frame.

FIG. 2 shows three types of parts used to build a flexed paraboloid space frame. Identical copies of these three parts are used throughout the paraboloid space frame. Two truss rails 20 and 20 with zigzag webbing 22 and several optional identical vertical connectors 24 are positioned as shown in FIG. 2 for assembly into a truss. There are other connection methods, such as rivets, that could eliminate the vertical connectors.

Figure 3:
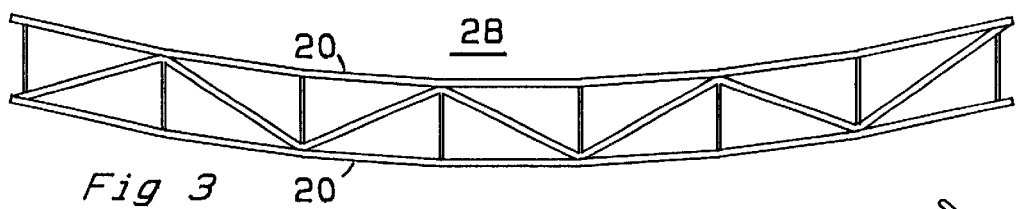
FIG. 3 shows a flexed parabolic truss.

FIG. 3 shows truss rails 20 and 20 flexed into smooth parabolic curves with lateral forces, and then connected to the zigzag webbing with the vertical connectors to form a flexed parabolic truss 28. Lateral forces are applied by supporting the ends of the rails and pressing down along the sides of the rails. Smooth parabolic curves are formed accurately from truss rail deflections caused by internal truss rail stress reactions. The flexed truss rails do not yield and are not permanently bent, therefore would spring back flat if released from the webbing. Any suitable webbing material may be attached to restrain the flexed truss rails. Identically curved parabolic trusses could also be made by casting metal, by stamping sheet metal, by curve rolling tubes, by forming composites, by assembling all straight short struts, or by other methods.

Figure 4:
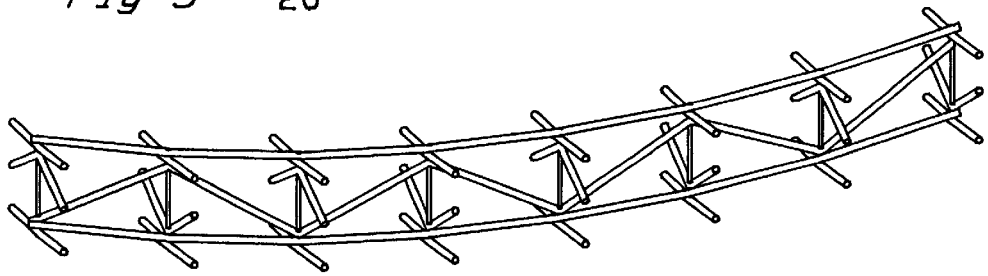
FIG. 4 shows a sectional view of a matrix space frame.

FIG. 4 is a sectional view of a paraboloidal matrix space frame showing one of several ways that orthogonal flexed parabolic trusses may share common vertical strut connectors. The vertical connectors are parallel to the axis of symmetry of the paraboloid and normal to the aperture of the paraboloid. Therefore, the components of the flexed parabolic trusses may be uniformly separated along shared vertical struts without changing uniform part dimensions or optics.

Figure 5:
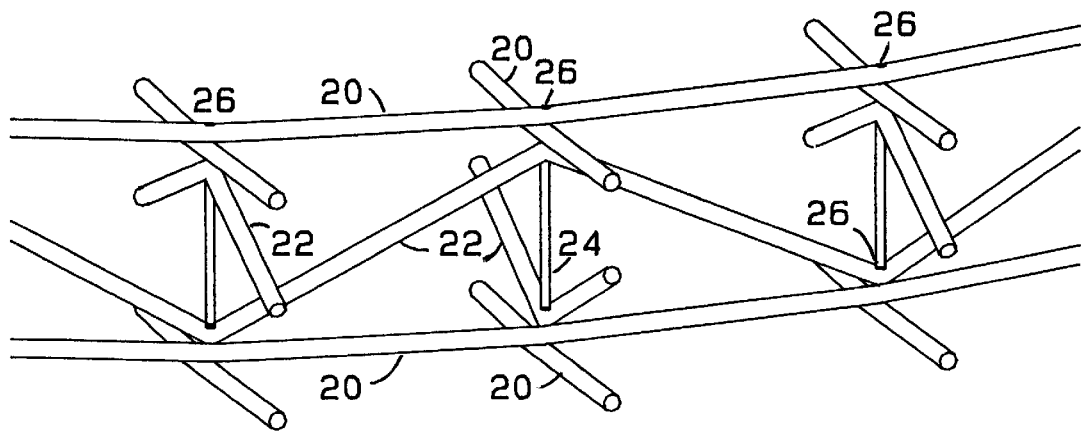
FIG. 5 shows a close-up view of matrix space frame holes for vertical connectors.

FIG. 5 shows one possible method of making connections with holes 26 drilled through the truss rails and the vertices of the zigzag webbing. The holes can be drilled accurately with a hand drill by inserting the truss rails into a pre-drilled steel pipe. The vertical connectors are inserted through the truss rail holes and the zigzag webbing holes then flared at both ends to form rivet heads. The shanks of the vertical connectors would have burrs or stops or additional concentric shorter tubes to sandwich the zigzag webbing against the truss rails. An alternative connection would insert rivets through the holes then expand the rivets inside the ends of the vertical connectors forming pregnant vertical connectors. There are other methods for connecting truss members together such as spot welding or using brackets.

FIG. 6 shows a row of identical unsupported rectangular slender flat glass mirrors 30 made from silver laminated to low-iron float glass of uniform thickness. The number of flat glass mirrors used is determined by receiver flux intensity requirements. Other types of flat glasses and flat mirror laminates could be used for making flat glass-like specular solar dish mirrors.

FIG. 7 shows a method of flexing a row of slender flat glass mirrors into parabolic curves with a row of identical straight trusses. A row of parabolic glass mirrors 32 is formed by supporting the short sides of rectangular slender flat glass mirrors 30 on two orthogonal straight trusses 34 and 34 then allowing the glass mirrors to sag from the force of gravity. Additional orthogonal straight trusses 36 are positioned under the parabolic glass mirrors for applying flexing forces to the glass when the glass is tilted out of plane with gravity and for supporting the glass under blizzard and hurricane loads. Tension buttons or other systems are used between the parabolic glass mirror edges and truss rails at the locations where straight trusses 36 cross orthogonally the parabolic glass mirror edges. This action of flexing the flat glass mirrors down toward the orthogonal trusses causes flat glass mirror spans between the trusses to deflect into accurate parabolic curves. The glass force reactions from the flexing forces occur on trusses 34 and 34 thereby restraining the mirrors in place. There are other configurations and tension materials that can also be used to flex slender flat glass mirrors into accurate parabolic curves. FIG. 7 illustrates a line focus or parabolic trough solar concentrator. The focal lengths of all the mirrors are identical.

FIG. 8 shows the method of flexing flat glass mirrors into a substantially paraboloidal dish curve with identical flexed parabolic trusses. A paraboloidal array of glass mirrors 38 is formed by supporting rectangular slender flat glass mirrors 30 near the mirror corners on two orthogonal flexed parabolic trusses 28 and 28 then allowing the glass mirrors to sag from the force of gravity or by other forces. Additional flexed parabolic trusses, all identical to flexed parabolic truss 28, are positioned under the paraboloidal array of glass mirrors for applying flexing forces to the glass when the glass is tilted out of plane with gravity and for supporting the glass under heavy weather. Tension elements are used between the glass mirrors and orthogonal truss rails. A glass force reaction from the flexing force occurs between the glass corners and the flexed parabolic trusses thereby holding the mirrors in place. There are other configurations that can also be used to flex slender flat glass mirrors into parabolic and hyperbolic curves with space frames. FIG. 8 illustrates a point focus or parabolic dish solar concentrator. The focal lengths of the parabolic mirrors change with mirror location on the dish. The mirrors near the center have shorter focal lengths than the mirrors near the edges.

FIG. 9 shows a mirror support frame 40 comprised of a row of parallel identical flexed parabolic trusses. The actual number of trusses used is determined by the ability of spans of unsupported stressed glass mirrors to withstand maximum wind, snow, and ice loads.

FIG. 10 shows a truss support frame 42 comprised of another row of parallel identical flexed parabolic trusses. Truss support frame 42 is identical to mirror support frame 40.

FIG. 11 shows a paraboloidal matrix space frame 44 formed from the mirror support frame and truss support frame arrayed orthogonally and connected together with common vertical connectors 24 as shown in FIG. 4 and FIG. 5. The entire paraboloidal matrix space frame is flexed from three identical-sized components; truss rails 20, zigzag webbing 22, and vertical connectors 24. Mirror support frame 40 within paraboloidal matrix space frame 44 is used to flex mirrors as shown in FIG. 8. There are other methods for supporting mirror support frames 40 such as torque tubes (not shown) connecting a row of identical flexed parabolic trusses 28 held in a paraboloidal shape.

Figure 12:
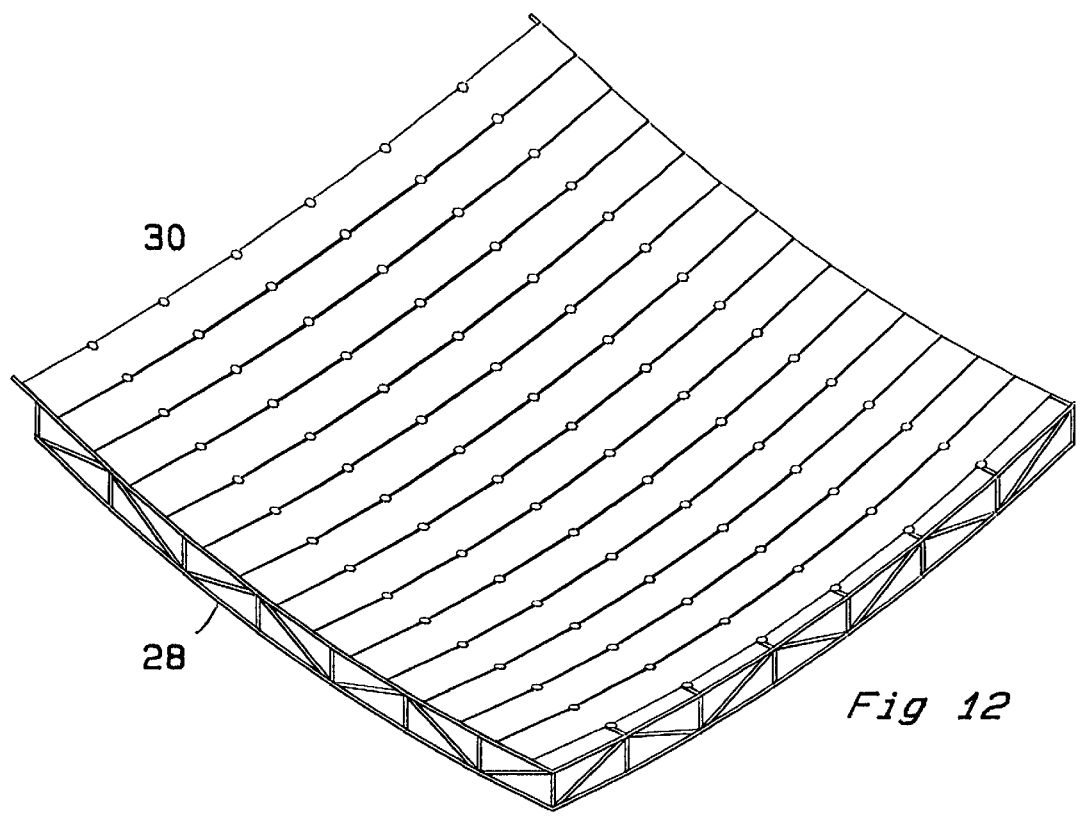
FIG. 12 shows buttons flexing glass into parabolic curves.
Figure 13:
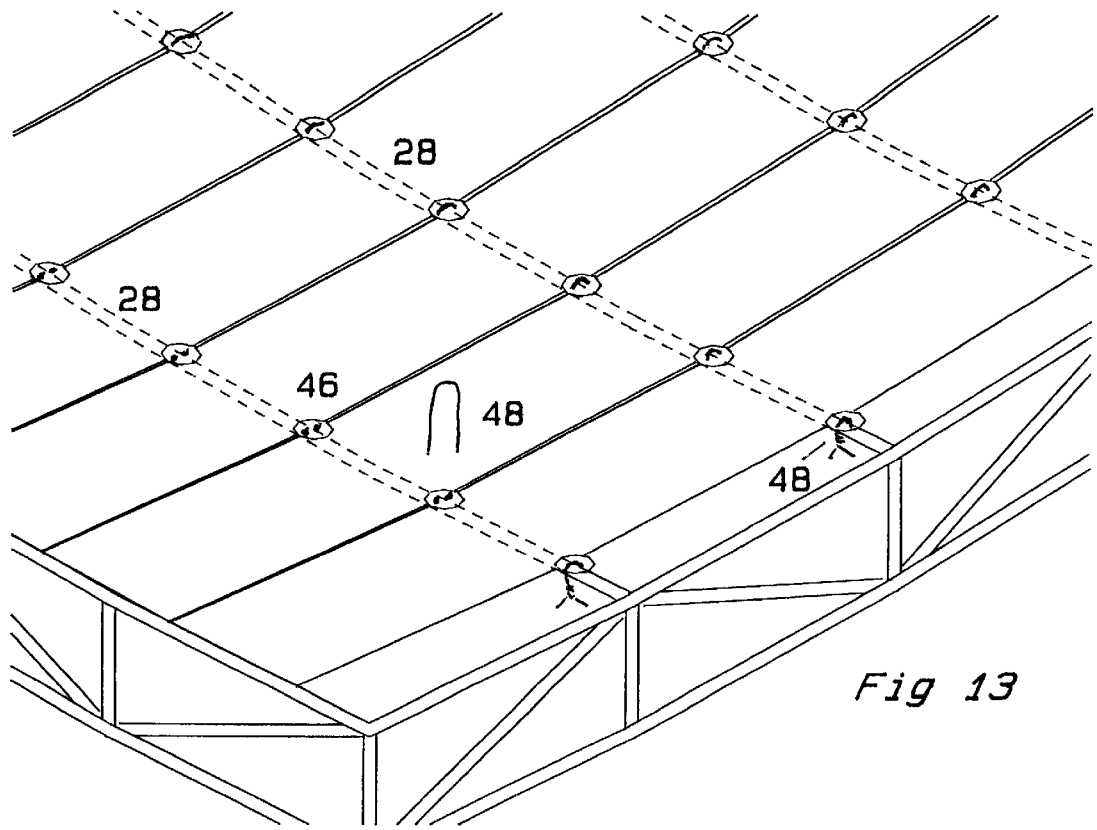
FIG. 13 shows wires threading the buttons to an orthogonal mirror support frame.

FIG. 12 and FIG. 13 show a row of slender flat glass mirrors 30 curved with a tension elements or buttons 46. The glass mirrors should be thick enough to withstand heavy wind, snow, and ice between tension elements, and thin enough to flex into parabolic curves suitable for solar dish optics. The glass mirrors should be long enough to minimize the effect of fixed hyperbolic curve errors located near the glass mirror corners. Rectangular slender flat glass mirrors 30 are shown positioned over orthogonal flexed parabolic trusses 28. The glass mirrors are supported near the corners and then flexed into parabolic curves with forces normal to the reflecting surfaces. Curves are not used during construction. Parabolic glass curves are created during construction from deflection of rigid flat glass resisting lateral force. The glass mirrors are not permanently curved and would spring back flat again if released from the support frame. Buttons 46 or other systems are used to maintain tension between the glass mirrors and the orthogonal trusses. Wires 48 are used as button thread to connect the buttons to the orthogonal trusses and sandwich consecutive glass mirror edges against the orthogonal truss rails. The wires make flexible connections between the glass mirrors and the truss rails thereby allowing for thermal expansion stress. The glass mirrors make loose contact with the orthogonal truss rails at points under the buttons. The glass mirrors are firmly held in place by the glass corners pressing hard against the outside trusses. This pressing force is a reaction from flexing stress, a force approximately equal to mirror weight. Other tension mechanisms connected to alternate support frames could also be used for flexing slender flat glass mirrors into parabolic curves.

EXAMPLE

For example, a solar dish is made with fifteen rectangles of low-iron window glass 3300 millimeters long, 230 millimeters wide, and 2 millimeters thick. The glass is coated with silver protected by copper depositions and paint layers. The mirrored glass is then forced towards an orthogonal support frame every 470 millimeters excluding the ends, thereby flexing and stressing the rigid glass mirror causing the glass mirror to deflect and form continuous accurate parabolic curves with focal lengths commensurate with a dish containing a 3300 millimeter focal length. Hyperbolic mirror surface errors in this example would be within 125 millimeters from the ends or corners of the glass mirrors, less than 8% of total mirror area. The hyperbolic curve area is fixed and independent of mirror length. Only long glass mirrors can be substantially deflected into parabolic curves without contiguous curve-forming substrates. In this example, a 1000 sun high-intensity photovoltaic receiver would be 40 millimeters wide and 250 millimeters long with a wider heat exchanger to transfer surface heat to fluids.

Figure 14:
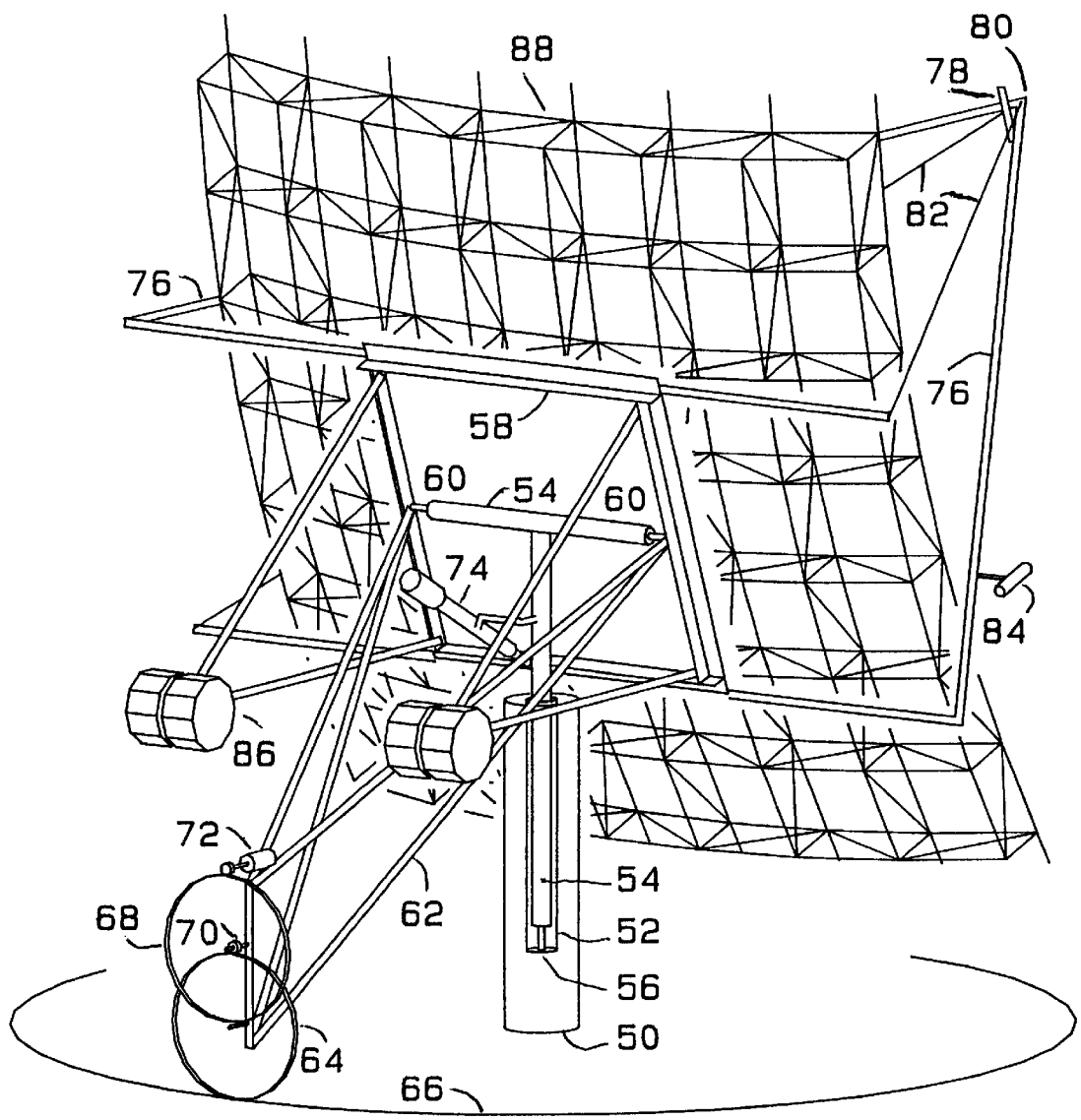
FIG. 14 shows a detailed view of the matrix dish.

FIG. 14 shows an altazimuth support carriage supporting a matrix solar dish concentrator with a rectangular aperture 88. A hollow concrete column 50 with an embedded polymer tube 52 supports a tee-bar 54. The tee bar rotates freely in the azimuth direction on centering pin 56. A square frame 58 is connected to the tee-bar at two zenith bearings 60 and 60 which could be just dry pins through drilled holes in the square frame. This square frame moves freely in the zenith direction. An azimuth drive support 62 is connected to the tee-bar at zenith bearings 60 and 60 and moves freely in the zenith direction to accommodate not level ground. An azimuth ground wheel 64, such as a bicycle wheel, is connected to the azimuth drive support and rolls along the ground leaving a trail or path 66. An optional second wheel 68 drives the ground wheel rim with a friction hub 70 for speed reduction. A small azimuth gear motor 72 is attached to the azimuth drive support and drives the wheel assembly rim with friction to track the matrix dish glass reflector in the solar azimuth direction. A zenith screw jack drive motor 74, preferably a low-cost television satellite dish actuator, is attached between the tee-bar and the square frame to track the matrix dish glass reflector in the solar zenith direction. Two receiver support tubes 76 and 76 are attached to the square frame and are used to carry fluids, power, and hydrogen from a receiver 78. The receiver is designed with abundant fluid surface area for heat removal via a bundle of tubes or extensive channels. The receiver support tubes are connected together at an apex 80 above a cone of reflected sunlight focused on receiver 78 and held in place with two receiver guy wires 82 and 82 connected at apex 80. Active or passive heat shields (not shown) are used near the receiver to protect this low-shade receiver support structure from off-sun scorching. A shadow-band solar eye box 84 is attached to a receiver support tube and houses four light detectors beneath two spherical lens and a microprocessor for active and passive solar tracking and to control receiver functions. Razor sharp shadow-band dividers, such as razor blades, are positioned at the focus points of the spherical lens and the light detectors are located on both sides of both dividers well below the lens focal planes and connected to the microprocessor thereby making digital active solar tracking very accurate. Two counterweights 86 are attached to the square frame to balance the dish and to reduce mechanical and electrical loads on the zenith drive. The matrix solar dish is attached to the square frame with fasteners between the square frame and some of the vertical strut connectors. A hail hood (not shown) could be attached to the leading edge for heavy hail protection.

In operation, a small amount of electrical power is applied to the microprocessor and to the azimuth and zenith drive motors. Water or other cooling fluids are pumped through the receiver support tubes and through the receiver. The microprocessor attempts to look at the sun and checks the time and dish position and system diagnostics then signals the azimuth and zenith drive motors to position the matrix solar dish normal to the sun. The azimuth gear motor drives the speed reducer wheel and ground wheel to rotate the tee-bar in the hollow column. The zenith drive motor tilts the square frame relative the tee-bar. Upon facing the sun, irradiating up to 850 Watts per square meter, the microprocessor records the time, date, and dish position into permanent memory for future reference for solar tracking during cloudy weather with passive tracking routines. The parabolic mirrors on the paraboloid surface reflect uniform high-intensity sunlight onto the receiver. The receiver generates hot water or other hot fluids from black heat exchangers at better than 90% efficiency and generates electricity from high-intensity photovoltaic cells at better than 30% efficiency and could manufacture hydrogen and oxygen from electrolysis of water. The receiver can also drive other chemical reactions and physical devices. The hydrogen is recycled in a fuel cell to reproduce electrical power and water when the sun is not available. The hot water is used locally or powers a district heating system.

During snow storms and heavy hail conditions the microprocessor on the dish frame would signal the zenith drive motor to face the dish mirror aperture towards the horizon for protection of the glass mirror.

While a simple light-weight durable solar dish is preferred, less than 15 kilograms per square meter, many other variations of the solar dish could also be deployed such as utilizing multiple quadrants of mirror arrays or other mirror configurations such as off-axis paraboloid focus locations.

What is claimed is:

1. A method for making a paraboloid space frame for directly supporting rectangular mirrors on a solar dish concentrator, said paraboloid space frame containing parabolic trusses with substantially identical focal lengths, said method comprising the steps of:
   a. providing a plurality of parabolic trusses, said parabolic trusses containing identical focal lengths;
   b. positioning said parabolic trusses substantially within planes that do not intersect the axis of symmetry of a paraboloid shape;
   c. positioning said parabolic trusses such that the concave edges of said parabolic trusses lie substantially on the concave surface of said paraboloid shape;
   d. connecting said parabolic trusses to a support frame;
whereby a solar dish space frame will be assembled from identical parts forming an array of identical parabolic trusses containing identical focal lengths for directly supporting an array of parabolic mirrors containing separate and unequal focal lengths as required by paraboloidal dish geometry.

2. A method of claim 1, further comprising the step of providing said parabolic trusses by forming curved parabolic trusses, said method comprising the steps of:
   a. providing slender truss rails with rigid connecting members;
   b. restraining the ends of said slender truss rails;
   c. forcing said slender truss rails with lateral force;
   d. allowing spans of said slender truss rails to deflect into substantially parabolic curves;
   e. attaching said rigid connecting members between the parabolically curved slender truss rails.

3. A method of claim 1, further comprising the step of providing said support frame by providing a row of said parabolic trusses forming an orthogonal matrix of parabolic trusses, said method comprising the steps of:
   a. positioning a first row of identical parallel parabolic trusses for mirror support;
   b. positioning a second row of identical parallel parabolic trusses forming said support frame orthogonal to said first row of identical parallel parabolic trusses;
   c. connecting the first row of parabolic trusses and the second row of parabolic trusses together forming a paraboloidal space frame matrix of orthogonal parabolic trusses.

4. A paraboloid frame for supporting mirrors in a solar dish concentrator, said paraboloid frame comprising uniform components, said paraboloid frame further comprising:
   a. a first row of parallel parabolic trusses, said first row of parallel parabolic trusses having identical focal lengths;
   b. a second row of parallel parabolic trusses, said second row of parallel parabolic trusses having identical focal lengths;
   c. means for connecting said first row of parallel parabolic trusses orthogonally with said second row of parallel parabolic trusses to form an orthogonal matrix of parabolic trusses forming said paraboloid frame containing a rectangular aperture.

5. A system for making rectangular parabolic glass mirrors for use in solar dish concentrators, said system further comprises:
   a. a plurality of parabolic trusses containing substantially identical focal lengths;
   b. a truss support frame;
   c. means for positioning said parabolic trusses parallel on said truss support frame forming a paraboloid shape containing a rectangular aperture;
   d. means for attaching said parabolic trusses to said support frame;
   e. a plurality of rectangular slender flat glass mirrors which are shaped substantially long and narrow with uniform thickness;
   f. a plurality of mirrow tension elements;
   g. means for supporting corner areas of said slender flat glass mirrors directly on said parabolic trusses with said mirror tension elements;
   h. means for forcing said slender flat glass mirrors toward said parabolic trusses with said mirror tension elements forming said flat glass mirrors into substantially parabolic curved glass mirrors.

6. A method for making rectangular parabolic glass mirrors for use in solar dish concentrators, said method comprising the steps of:
   a. assembling a mirror support space frame;
   b. providing rectangular slender flat glass mirrors which are shaped substantially long and narrow with uniform thickness;
   c. positioning said slender flat glass mirrors directly over said mirror support space frame;
   d. supporting corner areas of said slender flat glass mirrors directly on said mirror support space frame;
   e. forcing said slender flat glass mirrors toward said mirror support space frame;
   f. allowing spans of said slender flat glass mirrors to deflect forming substantially parabolic curves with various focal lengths;
whereby said slender flat glass mirrors will be flexed forming various parabolic curves containing various dish mirror focal lengths without reflector curve-forming substrates, said slender flat glass mirrors supported directly on a solar dish frame at said corner areas from glass flex force reactions.

* * * * *